United States Patent
Sacha et al.

(10) Patent No.: US 12,556,852 B2
(45) Date of Patent: Feb. 17, 2026

(54) PHYSIOLOGIC SENSING PLATFORM FOR COOPERATIVE USE WITH AN EAR-WEARABLE ELECTRONIC DEVICE

(71) Applicant: Starkey Laboratories, Inc., Eden Prairie, MN (US)

(72) Inventors: Michael Karl Sacha, Eden Prairie, MN (US); Kyle Olson, Eden Prairie, MN (US); Ryan Christensen, Eden Prairie, MN (US); Fa Wang, Eden Prairie, MN (US); Peter Flanagan, Eden Prairie, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 292 days.

(21) Appl. No.: 18/039,555

(22) PCT Filed: Sep. 24, 2021

(86) PCT No.: PCT/US2021/051896
§ 371 (c)(1),
(2) Date: May 31, 2023

(87) PCT Pub. No.: WO2022/132271
PCT Pub. Date: Jun. 23, 2022

(65) Prior Publication Data
US 2024/0007777 A1  Jan. 4, 2024

Related U.S. Application Data

(60) Provisional application No. 63/125,700, filed on Dec. 15, 2020.

(51) Int. Cl.
*H04R 1/10* (2006.01)
*A61B 5/00* (2006.01)
*H04R 25/00* (2006.01)

(52) U.S. Cl.
CPC ........ *H04R 1/1016* (2013.01); *A61B 5/0004* (2013.01); *A61B 5/6816* (2013.01);
(Continued)

(58) Field of Classification Search
CPC .... H04R 1/1016; H04R 25/609; H04R 1/105; H04R 25/554; H04R 2225/55; H04R 2460/11
See application file for complete search history.

(56) References Cited

U.S. PATENT DOCUMENTS 10,034,639 B2  7/2018  Van Dinther
10,213,141 B2  2/2019  Cole
(Continued)

FOREIGN PATENT DOCUMENTS

DE  102017209767 A1 * 12/2018  ......... A61B 5/02055
EP  3192439 A1  7/2017
(Continued)

OTHER PUBLICATIONS

International Patent Application No. PCT/US2021/051896, filed Sep. 24, 2021; International Search Report / Written Opinion, issued Dec. 21, 2021; 14 pages.
(Continued)

*Primary Examiner* — Sunita Joshi
(74) *Attorney, Agent, or Firm* — Mueting Raasch Group

(57) ABSTRACT

An ear-wearable electronic device includes a first near-field communication (NFC) device and a transfer region configured to facilitate transfer of a wearable sensor unit into an ear of a wearer or onto an outer ear of the wearer or a surface of the wearer's head adjacent the outer ear. The wearable sensor unit comprises electronic circuitry comprising a second NFC device configured to communicatively couple to the first NFC device and facilitate wireless transfer of power from the ear-wearable electronic device to the wear-
(Continued)

able sensor unit and wireless transfer of data at least from the wearable sensor unit to the ear-wearable electronic device, and one or more sensors configured to measure at least one physiologic parameter or physiologic condition of the wearer. The wearable sensor unit and the ear-wearable electronic device are configured to remain mechanically decoupled from one another subsequent to deployment of the wearable sensor unit.

20 Claims, 7 Drawing Sheets

(52) U.S. Cl.
CPC .......... *H04R 1/105* (2013.01); *H04R 25/554* (2013.01); *H04R 25/609* (2019.05); *H04R 2225/55* (2013.01); *H04R 2460/11* (2013.01)

(56) References Cited

U.S. PATENT DOCUMENTS

| | | |
|---|---|---|
| 2008/0275327 A1 | 11/2008 | Faarback |
| 2013/0191035 A1 | 7/2013 | Chon |
| 2017/0164878 A1 | 6/2017 | Connor |
| 2018/0042496 A1 | 2/2018 | Lachhman |
| 2018/0092601 A1 | 4/2018 | Wagner |
| 2018/0353134 A1 | 12/2018 | Walter |
| 2019/0133469 A1 | 5/2019 | Just |
| 2022/0014834 A1* | 1/2022 | Au ...................... A61B 5/6817 |

FOREIGN PATENT DOCUMENTS

| | | | | |
|---|---|---|---|---|
| EP | 3614694 A1 * | 2/2020 | ........... | H04R 25/554 |
| KR | 20180108359 A1 | 10/2018 | | |
| WO | WO 2011/066852 A1 | 6/2011 | | |
| WO | WO 2012/006677 A1 | 1/2012 | | |
| WO | WO-2016120870 A1 * | 8/2016 | ............... | A61B 5/01 |
| WO | WO 2018/224340 A1 | 12/2018 | | |
| WO | WO 2020/232121 A1 | 11/2020 | | |

OTHER PUBLICATIONS

International Patent Application No. PCT/US2021/051896, filed Sep. 24, 2021, International Preliminary Report on Patentability, issued Jun. 23, 2023; 10 pages.

* cited by examiner

*Figure 1A*
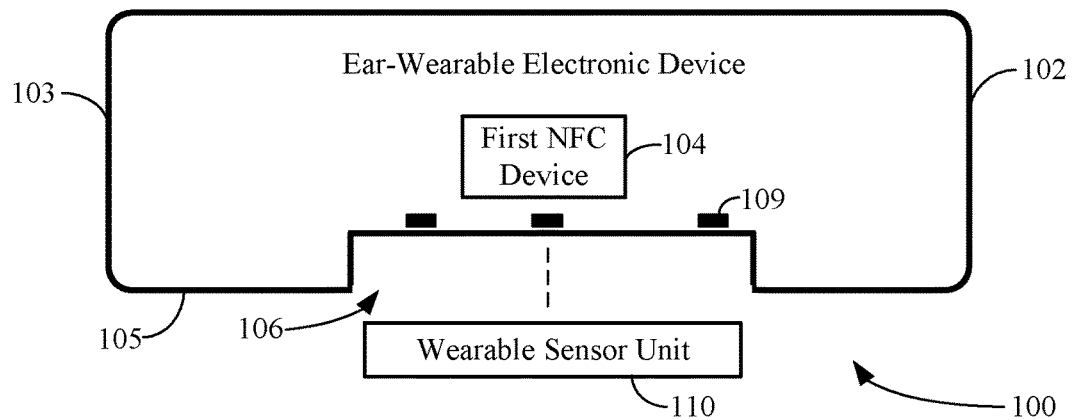
*Figure 1B*
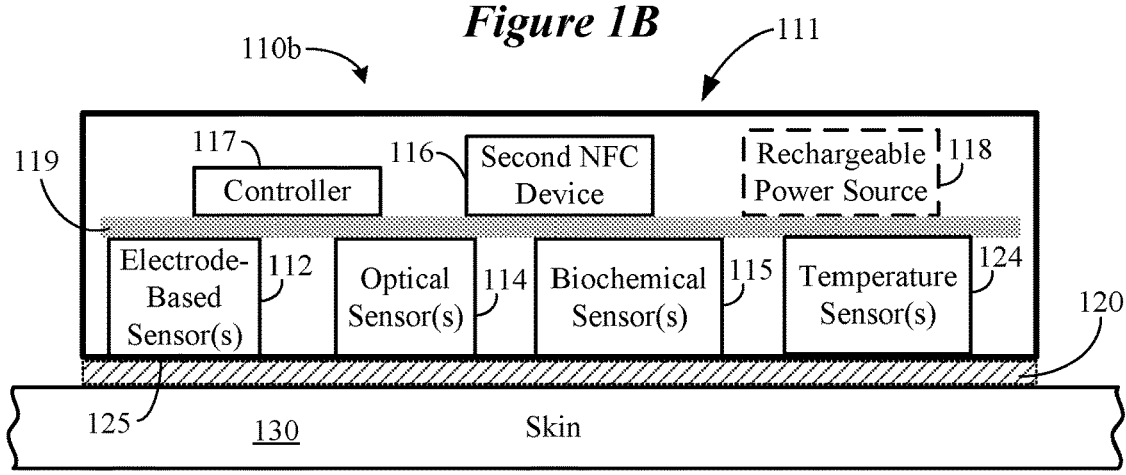
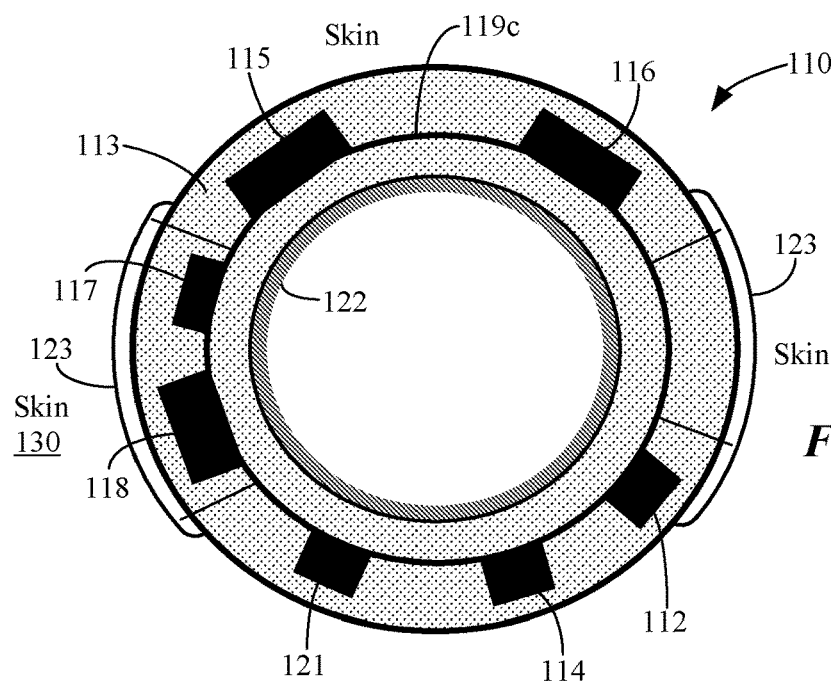
*Figure 1C*

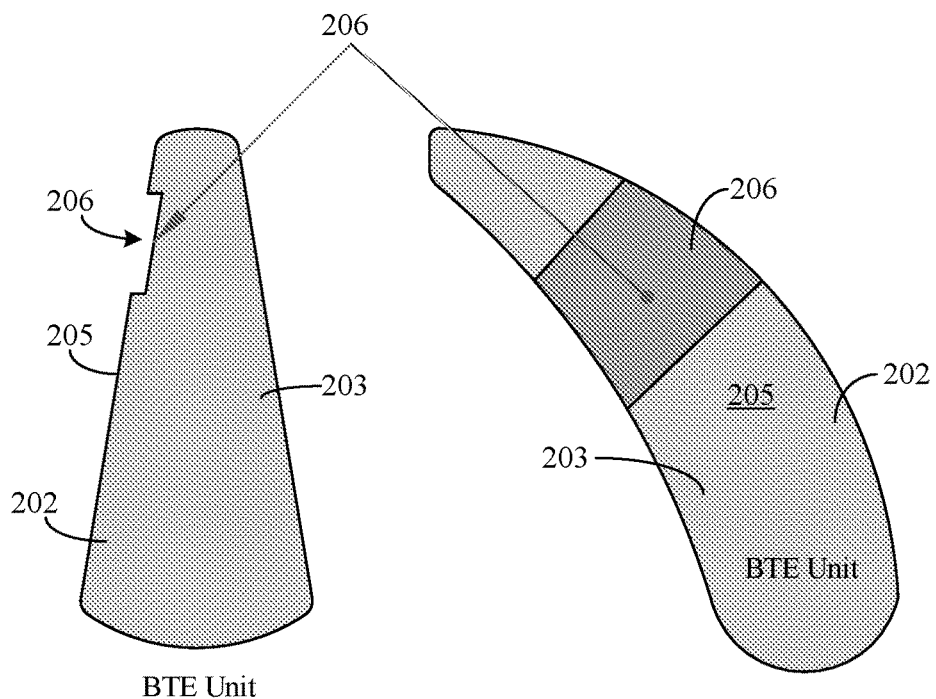
*Figure 2A*  *Figure 2B*
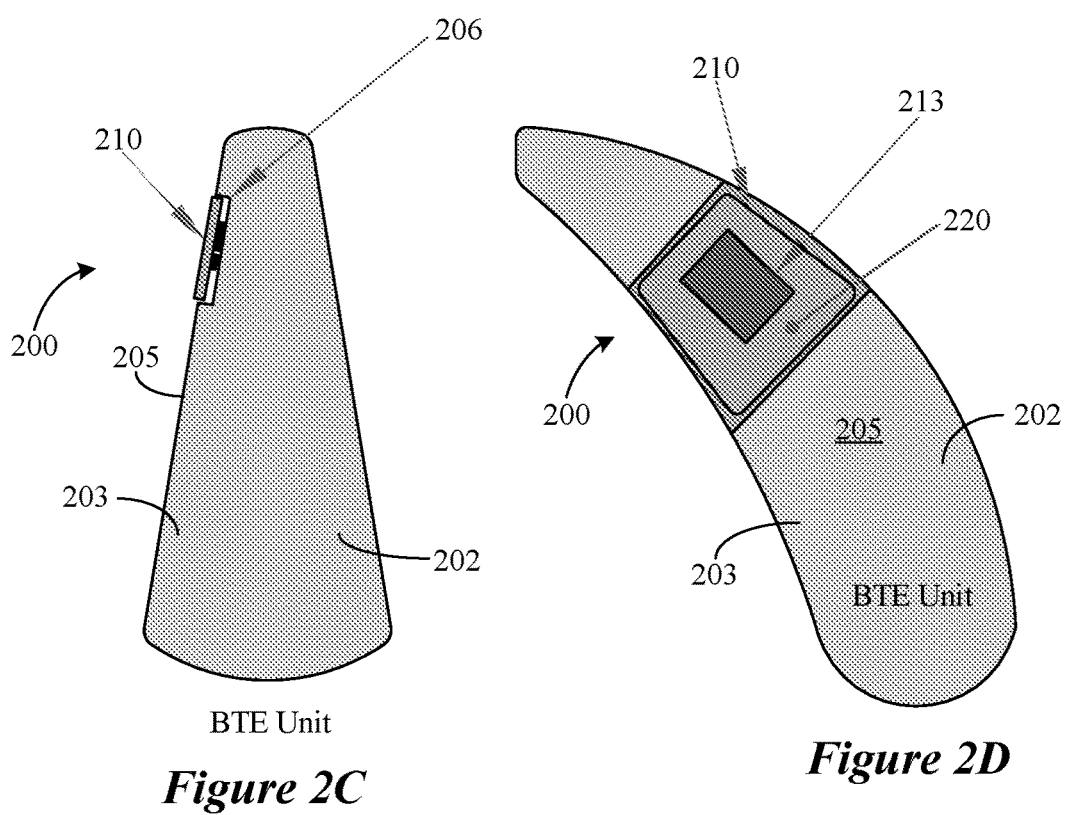
*Figure 2C*  *Figure 2D*

US 12,556,852 B2

PHYSIOLOGIC SENSING PLATFORM FOR COOPERATIVE USE WITH AN EAR-WEARABLE ELECTRONIC DEVICE

RELATED APPLICATIONS

This application is the § 371 U.S. National Stage of International Application No. PCT/US2021/051896, filed Sep. 24, 2021, which claims the benefit of U.S. Provisional Application No. 63/125,700, filed Dec. 15, 2020, the contents content of which are hereby incorporated by reference.

TECHNICAL FIELD

This application relates generally to a physiologic sensing platform configured for cooperative use with an ear-wearable electronic device including personal amplification devices, hearing aids, bone conduction devices, medical and/or diagnostic devices, health monitoring devices, biometric devices, personal activity monitoring devices, and consumer hearables.

SUMMARY

Embodiments are directed to a system comprising an ear-wearable electronic device which includes a first near-field communication (NFC) device and a transfer region configured to facilitate transfer of a wearable sensor unit into an ear of a wearer or onto an outer ear of the wearer or a surface of the wearer's head adjacent the outer ear. The wearable sensor unit comprises electronic circuitry comprising a second NFC device configured to communicatively couple to the first NFC device and facilitate wireless transfer of power from the ear-wearable electronic device to the wearable sensor unit and wireless transfer of data at least from the wearable sensor unit to the ear-wearable electronic device, and one or more sensors configured to measure at least one physiologic parameter or physiologic condition of the wearer. The wearable sensor unit and the ear-wearable electronic device are configured to remain mechanically decoupled from one another subsequent to transfer of the wearable sensor unit into the wearer's ear or onto the outer ear of the wearer or the surface of the wearer's head adjacent the outer ear.

Embodiments are directed to a method comprising mechanically coupling an ear-wearable electronic device comprising a first near-field communication (NFC) device and a wearable sensor unit comprising a second NFC device, transferring the wearable sensor unit into an ear of a wearer or onto an outer ear of the wearer or a surface of the wearer's head adjacent the outer ear using the mechanically coupled ear-wearable electronic device, mechanically decoupling the wearable sensor unit and the ear-wearable electronic device after transferring the wearable sensor unit, wirelessly transferring, while mechanically decoupled, power from the ear-wearable electronic device to the wearable sensor unit, and wirelessly transferring, while mechanically decoupled, data at least from the wearable sensor unit to the electronic device.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 1A illustrates a system comprising an ear-wearable electronic device and a physically separable wearable sensor unit in accordance with any of the embodiments disclosed herein;

FIG. 1B illustrates various components of the wearable sensor unit shown in FIG. 1A in accordance with any of the embodiments disclosed herein;

FIG. 1C illustrates a wearable sensor unit configured for in-canal deployment in accordance with any of the embodiments disclosed herein;

FIGS. 2A-2D illustrate a system comprising an ear-wearable electronic device and a physically separable wearable sensor unit in accordance with any of the embodiments disclosed herein;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1D:
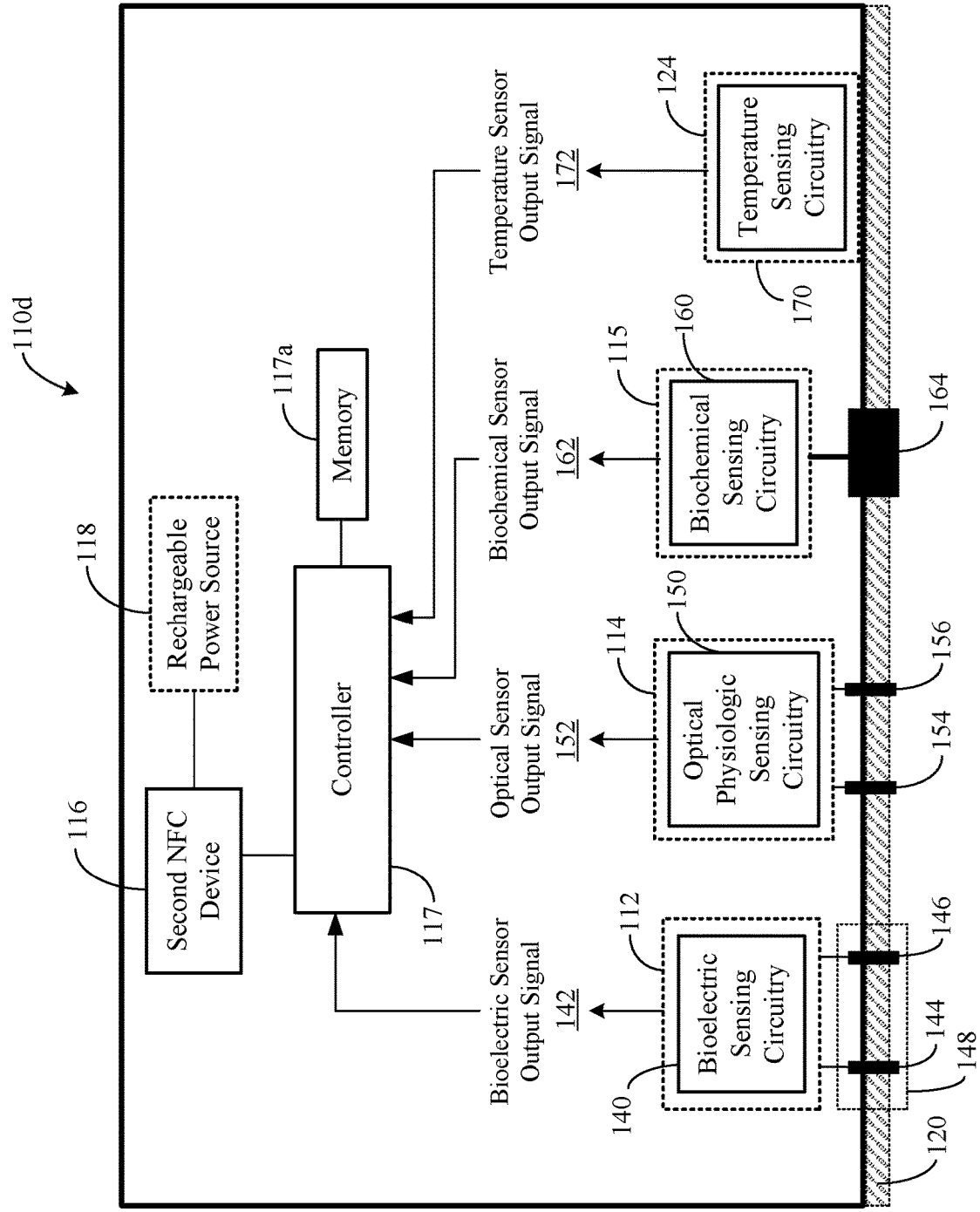
FIG. 1D illustrates various components of a wearable sensor unit in accordance with any of the embodiments disclosed herein.

Sensing physiologic signals from a subject's outer ear has many challenges. For example, signals produced by many physiologic sensors can be corrupted by motion artifacts resulting from relative motion between the physiologic sensor and body tissue (e.g., skin) while performing a sensing operation. For many optical physiologic sensors, for example, any variation in contact pressure with the skin will result in noisy data. In electrode-based sensing, any electrode motion will also result in noisy data. In glucose sensing with microneedles, for example, any relative motion between microneedles and skin will result in skin irritation and reduced needle longevity.

Embodiments of the disclosure are directed to a wearable sensor unit configured for cooperative use with an ear-wearable electronic device. In accordance with embodiments disclosed herein, the wearable sensor unit constitutes a sensing and communication device which is physically separable from the ear-wearable electronic device. According to any of the embodiments disclosed herein, the wearable sensor unit includes one or more physiologic sensors, optionally one or more non-physiologic sensors, and wireless near-field communication circuitry configured for wireless power and data transfer.

In accordance with any of the embodiments disclosed herein, the housing of the ear-wearable electronic device can be configured and used to locate and place the wearable sensor unit onto or into the body (e.g., on or in the ear, including the ear canal; on the head adjacent the ear). When concurrently deployed in or on a subject's ear or head, the wearable sensor unit and the ear-wearable electronic device are communicatively coupled to facilitate wireless power transfer from the ear-wearable electronic device to the wearable sensor unit and, in addition, data transfer between the ear-wearable electronic device and the wearable sensor unit.

By physically isolating the larger ear-wearable electronic device from the smaller wearable sensor unit, the wearable sensor unit is isolated from large movements of the ear-wearable electronic device. This isolation provides for higher quality sensor data which simplifies and reduces computational burden. The conventional way of mitigating PPG (photoplethysmogram) sensor motion artifacts is to subtract accelerometer data from the PPG sensor signal in software. This approach requires an added accelerometer sensor and a sufficiently robust processor to execute such software, which adds to system complexity and cost. In the case of optical physiologic sensors, such as a PPG sensor, this isolation simplifies or reduces motion artifacts from contaminating the optical sensor data. Eliminating the accelerometer and robust processor discussed above has clear benefits in reduced component size and cost, inventory reduction, power savings, and reduced processing requirements.

In the case of electrode-based sensors (e.g., EEG, EMG, EOG, GSR sensors), electrode motion relative to skin induces undesired voltage changes that can mask desired signals (e.g., cortical signals). Some motion induced signals can be very challenging to remove. High pass filtering is typically required to minimize motion generated artifacts, which can adversely limit signal scrutiny at low frequencies (<20 Hz). Deployment of a wearable sensor unit which includes one or more electrode-based sensors advantageously reduces or eliminates motion artifacts from signals produced from electrode-based sensors. Moreover, embodiments of the disclosed sensing approach is passive and eliminates noise at the source. Physically isolating the larger ear-wearable electronic device from the smaller wearable sensor unit has other benefits including providing for faster data acquisition, less/simpler signal filtering, more accurate data, lower system power—less processing, and the ability to reveal finer sensor signal details.

Embodiments of the disclosure are defined in the claims. However, below there is provided a non-exhaustive listing of non-limiting examples. Any one or more of the features of these examples may be combined with any one or more features of another example, embodiment, or aspect described herein.

Example Ex1. A system comprises an ear-wearable electronic device comprising a first near-field communication (NFC) device and a transfer region configured to facilitate transfer of a wearable sensor unit into an ear of a wearer or onto an outer ear of the wearer or a surface of the wearer's head adjacent the outer ear. The wearable sensor unit comprises electronic circuitry comprising a second NFC device configured to communicatively couple to the first NFC device and facilitate wireless transfer of power from the ear-wearable electronic device to the wearable sensor unit and wireless transfer of data at least from the wearable sensor unit to the ear-wearable electronic device, and one or more sensors configured to measure at least one physiologic parameter or physiologic condition of the wearer. The wearable sensor unit and the ear-wearable electronic device are configured to remain mechanically decoupled from one another subsequent to transfer of the wearable sensor unit into the wearer's ear or onto the outer ear of the wearer or the surface of the wearer's head adjacent the outer ear.

Example Ex2. The system according to Ex1, wherein the wearable sensor unit comprises a substantially planar flexible printed circuit board (PCB) configured to support at least the electronic circuitry, the second NFC device, and the one or more sensors.

Example Ex3. The system according to Ex1 or Ex2, wherein the ear-wearable electronic device comprises a housing configured for behind-the-ear deployment, the transfer region defines a recessed region of the housing configured to receive the wearable sensor unit, and the transfer region is situated on the housing at a location that facilitates transfer of the wearable sensor unit to a specified location of the outer ear of the wearer or the surface of the wearer's head adjacent the outer ear.

Example Ex4. The system according to one or more of Ex1 to Ex3, wherein the ear-wearable electronic device comprises a housing configured for behind-the-ear deployment, and the wearable sensor unit comprises a biocompatible adhesive disposed on a surface configured to contact the outer ear of the wearer or the surface of the wearer's head adjacent the outer ear.

Example Ex5. The system according to one or more of Ex1 to Ex4, wherein the ear-wearable electronic device comprises a housing configured for deployment at least partially in an ear canal and a concha of the wearer's ear, the transfer region defines a recessed region of the housing configured to receive the wearable sensor unit, and the transfer region is situated on the housing at a location that facilitates transfer of the wearable sensor unit to a tragus of the wearer's ear.

Example Ex6. The system according to Ex1, wherein the wearable sensor unit comprises a substantially cylindrical flexible printed circuit board (PCB) configured to support at least the electronic circuitry, the second NFC device, and the one or more sensors.

Example Ex7. The system according to Ex6, wherein the ear-wearable electronic device is configured for deployment at least partially in an ear canal of the wearer's ear, the wearable sensor unit is configured for deployment in the ear canal, and the transfer region defines a terminal distal surface of the ear-wearable electronic device configured to contact a terminal proximal surface of the wearable sensor unit to facilitate transfer of the wearable sensor unit into the ear canal.

Example Ex8. The system according to one or more of Ex1 to Ex7, wherein, the one or more sensors are configured as sensors that produce signals corruptible by motion artifacts, and mechanically decoupling the wearable sensor unit and the ear-wearable electronic device from one another serves to reduce or eliminate corruption of the sensor signals by motion artifacts.

Example Ex9. The system according to one or more of Ex1 to Ex8, wherein the one or more sensors comprise an optical sensor configured to produce a photoplethysmogram (PPG).

Example Ex10. The system according to one or more of Ex1 to Ex9, wherein the one or more sensors comprise a bed of microneedles.

Example Ex11. The system according to Ex10, wherein the one or more sensors comprise a blood glucose sensor.

Example Ex12. The system according to one or more of Ex1 to Ex11, wherein the one or more sensors comprise an electrodermal activity sensor or a bioimpedance sensor.

Example Ex13. The system according to one or more of Ex1 to Ex12, wherein the one or more sensors comprise one or more of an electroencephalography (EEG) sensor, an electromyography (EMG) sensor, an electrooculography (EOG) sensor, and an electrocardiogram (ECG) sensor.

Example Ex14. The system according to one or more of Ex1 to Ex13, wherein the one or more sensors comprise one or more temperature sensors.

Example Ex15. The system according to one or more of Ex1 to Ex14, wherein the one or more sensors comprise a biochemical sensor.

Example Ex16. The system according to one or more of Ex1 to Ex15, wherein the one or more sensors comprise an optical sensor configured to sense presence and absence of ambient light.

Example Ex17. The system according to one or more of Ex1 to Ex16, wherein the first and second NFC devices comprise inductive or capacitive NFC device.

Example Ex18. The system according to one or more of Ex1 to Ex17, wherein the first and second NFC devices comprise an optical NFC device.

Example Ex19. The system according to one or more of Ex1 to Ex18, wherein the wearable sensor unit is a passive wearable sensor unit.

Example Ex20. The system according to one or more of Ex1 to Ex19, wherein the ear-wearable electronic device comprises a hearing device.

Example Ex21. The system according to one or more of Ex1 to Ex20, wherein the ear-wearable electronic device comprises a hearing aid.

Example Ex22. A method comprises mechanically coupling an ear-wearable electronic device comprising a first near-field communication (NFC) device and a wearable sensor unit comprising a second NFC device, transferring the wearable sensor unit into an ear of a wearer or onto an outer ear of the wearer or a surface of the wearer's head adjacent the outer ear using the mechanically coupled ear-wearable electronic device, mechanically decoupling the wearable sensor unit and the ear-wearable electronic device after transferring the wearable sensor unit, wirelessly transferring, while mechanically decoupled, power from the ear-wearable electronic device to the wearable sensor unit, and wirelessly transferring, while mechanically decoupled, data at least from the wearable sensor unit to the electronic device.

Example Ex23. The method according to Ex22, wherein transferring the wearable sensor unit comprises transferring the wearable sensor unit to a behind-the-ear location of the wearer's outer ear.

Example Ex24. The method according to Ex22, wherein transferring the wearable sensor unit comprises transferring the wearable sensor unit to a tragus of the wearer's outer ear.

Example Ex25. The method according to Ex22, wherein transferring the wearable sensor unit comprises transferring the wearable sensor unit into an ear canal of the wearer.

Example Ex26. The method according to Ex22, wherein transferring the wearable sensor unit comprises transferring the wearable sensor unit to a location of the wearer's head proximate an inner surface of the wearer's pinna.

Example Ex27. The method according to one or more of Ex22 to Ex26, wherein transferring the wearable sensor unit comprises adhesively affixing the wearable sensor unit to skin of the wearer's outer ear or head.

Example Ex28. The method according to one or more of Ex22 to Ex27, wherein the one or more sensors are configured as sensors that produce signals corruptible by motion artifacts, and mechanically decoupling the wearable sensor unit and the ear-wearable electronic device from one another reduces or eliminates corruption of the sensor signals by motion artifacts.

Example Ex29. The method according to one or more of Ex22 to Ex28, wherein the one or more sensors comprise an optical sensor configured to produce a photoplethysmogram (PPG).

Example Ex30. The method according to one or more of Ex22 to Ex29, wherein the one or more sensors comprise a bed of microneedles.

Example Ex31. The method according to Ex30, wherein the one or more sensors comprise a blood glucose sensor.

Example Ex32. The method according to one or more of Ex22 to Ex31, wherein the one or more sensors comprise an electrodermal activity sensor or a bioimpedance sensor.

Example Ex33. The method according to one or more of Ex22 to Ex32, wherein the one or more sensors comprise one or more of an electroencephalography (EEG) sensor, an electromyography (EMG) sensor, an electrooculography (EOG) sensor, and an electrocardiogram (ECG) sensor.

Example Ex34. The method according to one or more of Ex22 to Ex33, wherein the one or more sensors comprise one or more temperature sensors.

Example Ex35. The method according to one or more of Ex22 to Ex34, wherein the one or more sensors comprise a biochemical sensor.

Example Ex36. The method according to one or more of Ex22 to Ex35, wherein the one or more sensors comprise an optical sensor configured to sense presence and absence of ambient light.

Example Ex37. The method according to one or more of Ex22 to Ex36, wherein the first and second NFC devices comprise inductive or capacitive NFC device.

Example Ex38. The method according to one or more of Ex22 to Ex37, wherein the first and second NFC devices comprise an optical NFC device.

Example Ex39. The method according to one or more of Ex22 to Ex38, wherein the wearable sensor unit is a passive wearable sensor unit.

Example Ex40. The method according to one or more of Ex22 to Ex39, wherein the ear-wearable electronic device comprises a hearing device.

Example Ex41. The method according to one or more of Ex22 to Ex40, wherein the ear-wearable electronic device comprises a hearing aid.

FIG. 1A illustrates a system 100 comprising an ear-wearable electronic device 102 and a physically separable wearable sensor unit 110 in accordance with any of the embodiments disclosed herein. The ear-wearable electronic device 102 shown in FIG. 1 is representative of any electronic device configured for deployment at, on, about or in an outer ear of a wearer (e.g., positionable at any outer ear location, such as the pinna, concha, tragus, up to or including at least part of the ear canal), including the wearer's head adjacent the outer ear. For example, the ear-wearable electronic device 102 can be a behind-the-ear (BTE) device or an in-the-ear (ITE) device, particular examples of which are discussed hereinbelow. The ear-wearable electronic device 102 includes a housing 103 which contains or supports a number of components, including a first near-field communication (NFC) device 104 and any of the components shown in FIG. 9, for example.

The housing 103 includes a skin contact surface 105 which includes a transfer region 106 configured to facilitate transfer of the wearable sensor unit 110 to skin 130 of a wearer of the system 100. According to any of the embodiments disclosed herein, the transfer region 106 of the housing 103 can be configured to facilitate transfer of the wearable sensor unit 110 onto an outer ear of the wearer, onto a surface of the wearer's head adjacent the outer ear, or into an ear of the wearer. Typically, but not necessarily, the wearable sensor unit 110 is configured for impermanent deployment (e.g., hours, days, months) in, on, or near (e.g., head location adjacent the outer ear) the wearer's outer ear.

The wearable sensor unit 110 is configured to be temporarily constrained by or at the transfer region 106 of the housing 103 prior to deployment in, on, or near (e.g., head location adjacent the outer ear) the wearer's ear. In the representative embodiment shown in FIG. 1, the transfer region 106 comprises a recessed portion of the housing 103 which is at least as large as, and typically slightly larger than, the footprint of the wearable sensor unit 110. The recessed transfer region 106 can have a depth as deep as, slightly deeper than, or slightly shallower than, the height dimension of the wearable sensor unit 110. As such, the wearable sensor unit 110 can be flush with, slightly recessed from, or slightly protruding from the contact surface 105 of the housing 103 prior to deployment on the wearer's skin.

Depending on the configuration of the system 100, the wearable sensor unit 110 can be configured to be mechanically captured by the transfer region 106 of the housing 103, such as by mechanical interference created between the transfer region 106 and the wearable sensor unit 110. In some configurations, a passive material (e.g., silicone or other gel) can be disposed between the transfer region 106 and the wearable sensor unit 110 to temporarily affix the wearable sensor unit 110 to the transfer region 106. In other configurations, one or more magnets 109 can be positioned in the housing 107 proximate the transfer region 106 and configured to magnetically retain the wearable sensor unit 110 against the transfer region 106 prior to deployment.

Prior to deployment, the wearable sensor unit 110 is placed within or at the transfer region 106 of the ear-wearable electronic device 102, where it is temporarily retained until deployed. When properly positioned on or in the outer ear at the desired location, the ear-wearable electronic device 102 is manipulated to cause contact between the wearable sensor unit 110 and the target skin location, resulting in physical transfer of the wearable sensor unit 110 to the target skin location. The wearable sensor unit 110 is impermanently affixed to skin at the target location typically via a biocompatible adhesive. After physically transferring the wearable sensor unit 110 to the target skin location, the ear-wearable electronic device 102 and the wearable sensor unit 110 are mechanically decoupled from one another.

During cooperative use of the ear-wearable electronic device 102 on or in the ear and the wearable sensor unit 110 affixed at the desired skin location, the ear-wearable electronic device 102 and the wearable sensor unit 110 remain mechanically decoupled from one another, notwithstanding their close proximity (e.g., due to a gap between the transfer region 106 and the wearable sensor unit 110). As such, the wearable sensor unit 110 has little or no physical contact with the ear-wearable electronic device 102 during cooperative deployment and operation on or in the wearer's ear. The absence of physical contact between the transfer region 106 and the wearable sensor unit 110 eliminates or reduces undesirable motion artifacts that can otherwise corrupt the signals produced by one or more sensors of the wearable sensor unit 110. The reduction or elimination of sensor motion artifacts provides for higher quality data to be collected by the wearable sensor unit 110. By physically separating the physiologic sensor(s) of the wearable sensor unit 110 from the housing 103 of the ear-wearable electronic device 102, motion of the housing 103 does not transfer to the physiologic sensor(s) of the wearable sensor unit 110, thereby reducing or eliminating sensor data corruption resulting from such housing motion.

FIG. 1B illustrates various components of the wearable sensor unit 110b shown in FIG. 1A in accordance with any of the embodiments disclosed herein. The wearable sensor unit 110b shown in FIG. 1B includes electronic and power circuitry 111 disposed on or operatively coupled to a printed circuit board (PCB) 119, such as a flexible or rigid PCB. The PCB 119 can be a substantially planar printed circuit board (PCB), such as a flexible or rigid PCB. It is understood that the components of the electronic and power circuitry 111 can be arranged on the PCB 119 in various configurations, and that the arrangement shown in FIG. 1B is for purposes of illustration and not of limitation. A contact surface 125 of the wearable sensor unit 110b can comprise a flexible (or rigid) biocompatible material (e.g., plastic or metal substrate) and include a coating of a biocompatible adhesive 120 for temporarily affixing the wearable sensor unit 110b to skin 130 of the wearer's outer ear or the wearer's head adjacent the outer ear.

One or more sensors and a second NFC device 116 are disposed on or operatively coupled to the PCB 119. For example, one or more electrode-based physiologic sensors 112 can be disposed on or operatively coupled to the PCB 119. Additionally, or alternatively, one or more optical sensors 114 can be disposed on or operatively coupled to the PCB 119. The optical sensors 114 can include one or more physiologic optical sensors. The optical sensors 114 can also include one or more non-physiologic optical sensors, such as an ambient light sensor configured to sense presence and absence of ambient light. The wearable sensor unit 110b can also include one or more temperature sensors 124.

Additionally, or alternatively, one or more biochemical sensors 115 can be disposed on or operatively coupled to the PCB 119. The electrode-based sensor(s) 112 and/or optical sensor(s) 114 are configured to measure one or more physiologic parameters or physiologic conditions of the wearer of the system 100. The biochemical sensor(s) 115 are configured to measure a chemical or biological quantity present in a body fluid of the wearer's skin 130. In some embodiments, a motion sensor (e.g., an accelerometer, gyro, inertial measurement unit/IMU) can be disposed on or operatively coupled to the PCB 119 (see, e.g., FIG. 1C). The motion sensor can be configured to sense motion of the wearer for producing more accurate sensor data. The motion sensor can also be used as a fall detector. In the context of an in-canal wearable sensor unit discussed hereinbelow, the motion sensor can additionally provide accurate motion data for concussion monitoring and detection.

In accordance with any of the embodiments disclosed herein, at least one of the optical sensors 114 can be implemented as PPG sensor configured to produce a photoplethysmogram. In some implementations, the PPG sensor can be implemented as a pulse oximeter. PPG sensors are known to be sensitive to relative motion between the PPG sensor and tissue in contact with the PPG sensor, resulting in motion artifacts that can significantly corrupt the PPG sensor signal. Mechanically decoupling the wearable sensor unit 110b and the ear-wearable electronic device 102 from one another as described herein advantageously serves to reduce or eliminate corruption of the PPG sensor signal by motion artifacts. Moreover, this mechanical the coupling feature of the system 100 advantageously eliminates the need for a motion sensor signal otherwise required to reduce motion artifacts in the PPG sensor signal using power-consuming signal processing techniques.

The wearable sensor unit 110b includes a controller 117 which includes, or is coupled to a memory. The controller 117 is configured to control operations of the wearable sensor unit 110b, including operation of the electrode-based sensor(s) 112, optical sensor(s) 114, and/or biochemical sensor(s) 115. For example, the controller 117 is configured to energize and de-energize the physiologic sensors 112, 114, 115 in accordance with executable instructions stored in the memory. The controller 117 can store sensor data in the memory and coordinate transfer of stored data and/or real-time data to the ear-wearable electronic device 102.

The second NFC device 116 is configured to communicatively couple to the first NFC device 104 of the ear-wearable electronic device 102 when the wearable sensor unit 110b and ear-wearable electronic device 102 are concurrently deployed on or in a wearer's ear. The second NFC device 116 is configured to facilitate wireless transfer of power from the ear-wearable electronic device 102 to the wearable sensor unit 110b. The second NFC device 116 includes, or is coupled to, power management circuitry configured to distribute power to the physiologic sensors 112, 114, 115 and the controller 117. In some embodiments, a rechargeable power source 118 can be disposed on or supported by the PCB 119 and electrically coupled to the second NFC device 116. The rechargeable power source 118 (e.g., a lithium-ion battery or cell, a thin-film battery, a capacitor, a supercapacitor) can accumulate and store energy received from the first NFC device 104 via the second NFC device 116. In accordance with embodiments that include a rechargeable power source 118, the wearable sensor unit 110b can continue operation for a number of hours (e.g., any number of hours between about 2 and 10 hours) after the ear-wearable electronic device 102 is removed from the wearer's ear.

The second NFC device 116 also facilitates wireless transfer of data produced by the electrode-based sensor(s) 112, optical sensor(s) 114, biochemical sensor(s) 115, and/or other sensors or electronic components of the wearable sensor unit 110b. The second NFC device 116 can be configured to facilitate wireless communication between the controller 117 of the wearable sensor unit 110 and a controller or processor of the ear-wearable electronic device 102.

In some implementations, the second NFC device 116 can be implemented as an optical power/data transfer device and the rechargeable power source 118 can include a photocell. An infrared LED can be located on the housing 103 of the ear-wearable electronic device 102 and arranged to irradiate the photocell 118. Optical energy produced by the photocell 118 can be accumulated in a small rechargeable battery (e.g., lithium-ion cell, thin-film battery) or a capacitor or supercapacitor. Data transmission from the wearable sensor unit 110b to the ear-wearable electronic device 102 can be facilitated using IR or magnetic-based communication circuitry and techniques.

FIG. 1C illustrates a wearable sensor unit 110c configured for in-canal deployment in a wearer's ear in accordance with any of the embodiments disclosed herein. The wearable sensor unit 110c shown in FIG. 1C can be configured for cooperative use with an ear-wearable electronic device comprising an in-canal component, such as an ITC (in-the-canal), CIC (completely-in-the-canal, IIC (invisible-in-canal) or in-the-ear (ITE) device (e.g., hearing aid or physiologic/activity monitor).

The wearable sensor unit 110c shown in FIG. 1C has a generally cylindrical shape and includes a substantially cylindrical PCB 119c disposed within a flexible sleeve 113. The PCB 119c is typically a flexible PCB, but may alternatively be a rigid or semi-rigid PCB. The flexible sleeve 113 can be formed from a suitable flexible biocompatible elastomer, such as silicone and urethane elastomers. The PCB 119c and other components of the wearable sensor unit 110c which are physically and/or electrically and/or optically coupled to the PCB 119c are disposed within the body of the sleeve 113 and/or on the outer surface of the sleeve 113. The flexible sleeve 113 provides for a comfortable and good fit of the wearable sensor unit 110c when deployed in an ear canal of a wearer's ear.

Figure 5:
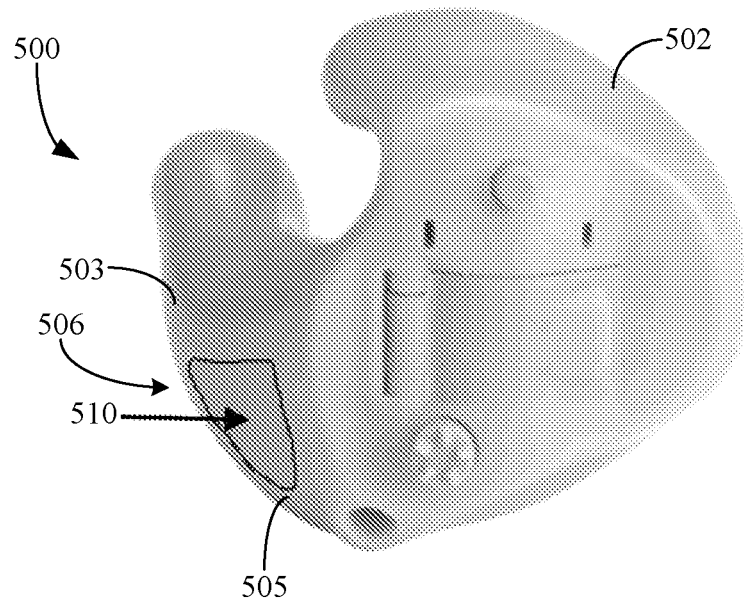
FIG. 5 illustrates a system comprising an ear-wearable electronic device and a wearable sensor unit configured for deployment within an ear of a wearer in accordance with any of the embodiments disclosed herein.
Figure 7A:
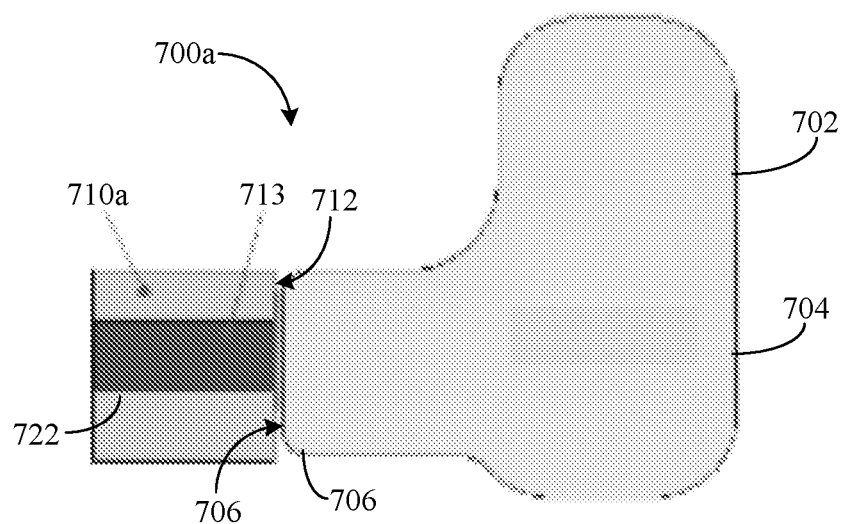
FIGS. 7A and 7A illustrate systems comprising an ear-wearable electronic device and a wearable sensor unit configured for deployment within an ear of a wearer in accordance with any of the embodiments disclosed herein.
Figure 7B:
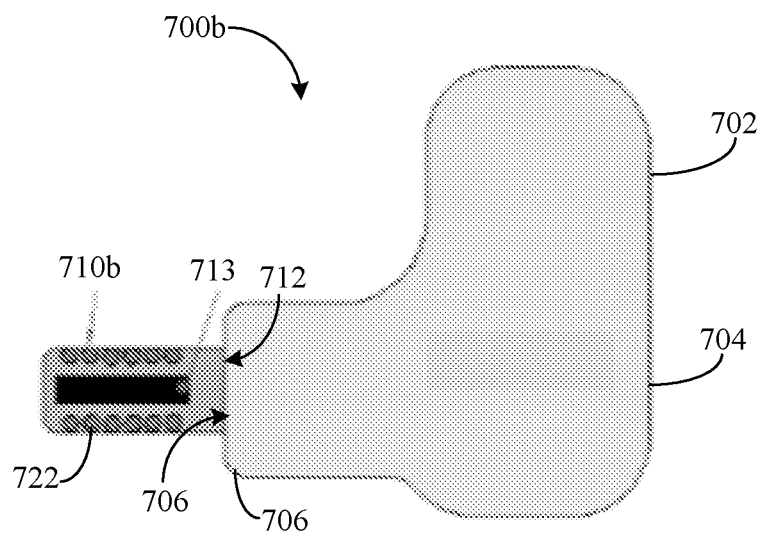

The wearable sensor unit 110c includes a second NFC device 116 configured to communicatively couple to the first NFC device 104 of an ear-wearable electronic device 102 configured to include an in-canal component when the wearable sensor unit 110c and ear-wearable electronic device 102 are concurrently deployed in a wearer's ear (see, e.g., FIGS. 5 and 7A-7B). The second NFC device 116 is configured to facilitate wireless transfer of power from the ear-wearable electronic device 102 to the wearable sensor unit 110c via a coil antenna 122, The second NFC device 116 includes, or is coupled to, power management circuitry configured to distribute power to the physiologic sensors 112, 114, 115, the controller 117, and other sensors and/or electronic components of the wearable sensor unit 110c. In some embodiments, a rechargeable power source 118 can be disposed on or operatively coupled to the PCB 119c and electrically coupled to the second NFC device 116. The rechargeable power source 118 (e.g., a lithium-ion battery or cell, a thin-film battery, a capacitor, a supercapacitor) can accumulate and store energy received from the first NFC device 104 of the ear-wearable electronic device 102 via second NFC device 116. The second NFC device 116 also facilitates wireless transfer of data produced by the electrode-based sensor(s) 112, optical sensor(s) 114, biochemical sensor(s) 115, and other sensors or electronic components of the wearable sensor unit 110c. The second NFC device 116 can be configured to facilitate wireless communication between the controller 117 of the wearable sensor unit 110c and a controller or processor of the ear-wearable electronic device 102.

The wearable sensor unit 110c can incorporate some or all of the components of the wearable sensor unit 110 shown in FIG. 1B. For example, one or more electrode-based sensors 112, one or more optical sensors 114, one or more biochemical sensors 115, a controller 117, and an optional rechargeable power source 118 can be disposed within and/or on the flexible sleeve 113 and physically and/or electrically and/or optically coupled to the PCB 119c. One or more electrode arrangements 123 each comprising two or more electrodes can be disposed on, or protrude to or beyond, an outer surface of the flexible sleeve 113. In some embodiments, at least one of the electrode arrangements 123 can include a bed of electrodes or microneedles. For example, at least one of the biochemical sensors 115 can be operatively coupled to a bed of microneedles for measuring a chemical or biological quantity from ear-canal skin in contact with the microneedles. As previously discussed, a motion sensor 121 can optionally be disposed within the flexible sleeve 113 and physically and/or electrically couple to the PCB 119c. Because the motion sensor 121 is positionable within the ear canal, the motion sensor 121 can serve as a concussion detector or monitor and/or a fall detector.

FIG. 1D illustrates various components of a wearable sensor unit 110d in accordance with any of the embodiments disclosed herein. Any one or more of the components shown in FIG. 1D can be included in any of the wearable sensor units disclosed herein. The electrode-based sensor(s) 112 can be configured to implement one or a number of different electrode-based measurements of the wearer's skin. Each of the electrode-based sensors 112 can include two or more electrodes 144, 146 configured to make electrical contact with skin of the wearer and couple electrical signals between the wearer's skin and bioelectric sensing circuitry 140. In some implementations, one or more of the electrode-based sensors 112 can include a bed of microneedles or microelectrodes 148. In response to signals received from the electrodes 144, 146, 148, the bioelectric sensing circuitry 140 produces a bioelectric sensor signal 142 which can be communicated to the controller 117 for storage in the memory 117a. According to some implementations, a set of the microneedles or microelectrodes 148 can form the basis for a very low power ear-to-ear communication link.

The bioelectric sensing circuitry 140 can be configured to one or more of sense, measure, and monitor changes in one or more of impedance, conductance, resistance, and capacitance of the wearer's skin. The bioelectric sensing circuitry 140 can be configured to one or more of sense, measure, and monitor changes in one or more of electrodermal activity, hydration, and perspiration of the wearer's skin. The bioelectric sensing circuitry 140 can be configured to measure and monitor electrical activity of various organs of the body, such as a wearer's heart (via an electrocardiogram or ECG), musculature (via an electromyogram or EMG), muscle or nerve action potential, brain (via an electroencephalogram or EEG), vision system (via an electrooptigram or EOG, electroretinogram or ERG), stomach (via an electrogastrogram or EGC), and skin (via a galvanic skin reflex or GSR). In some implementations, a subset of the microneedles or microelectrodes 148 can be used as electrodes for sensing one or more of ECG, EMG, EEG, EOG, ERG, EGC, and GSR waveforms, as well as other sensing applications that benefit from intimate body fluid contact.

The optical sensor(s) 114 can include a PPG sensor which utilizes a light emitter 154 (e.g., one or more LEDs or laser diodes) configured to couple light into skin of the wearer and a light detector 156 (e.g., a photosensor or photon detector) configured to receive light from the skin resulting from the light produced by the light emitter 154. Optical physiologic sensing circuitry 150 can be configured to produce a photoplethysmographic signal in response to light received by the light detector 156. In some embodiments in which at least two light sources of the light emitter 154 of different wavelengths are included in the PPG sensor, the optical physiologic sensing circuitry 150 can be configured to produce a pulse oximetry signal in response to light received by the light detector 156. In response to signals received from the light detector 156, the optical physiologic sensing circuitry 150 produces an optical sensor output signal 152 which can be communicated to the controller 117 for storage in the memory 117a.

The PPG waveform produced by the optical physiologic sensing circuitry 150 comprises a pulsatile ('AC') physiological waveform attributed to cardiac synchronous changes in the blood volume with each heartbeat, and is superimposed on a slowly varying ('DC') baseline with various lower frequency components attributed to respiration, sympathetic nervous system activity and thermoregulation. The optical sensor output signal 152 produced by the optical physiologic sensing circuitry 150 can be used to perform a number of different physiologic measurements, such as measuring blood oxygen saturation, blood pressure, cardiac output, assessing autonomic function, and detecting peripheral vascular disease. By way of example, the optical sensor output signal 152 produced by the optical physiologic sensing circuitry 150 can be used for measuring and monitoring one or more of heart rate, respiration, vascular condition/disease, arterial condition/disease, compliance and ageing, venous condition/disease, compliance and ageing, endothelial function, microvascular blood flow, vasospastic conditions, autonomic function monitoring, vasomotor function and thermoregulation, heart rate variability, orthostasis, and other cardiovascular variability conditions.

The biochemical sensor(s) 115 can be implemented as one or more devices capable of converting a chemical or biological quantity into an electrical signal. The biochemical sensor(s) 115 can be configured to interact with one of a variety of body fluids, such as sweat and interstitial fluids. In various implementations, the biochemical sensor(s) 115 include an analyte molecule, a chemically sensitive layer, and a transducer. In some implementations, the biochemical sensor(s) 115 can include a bed of microneedles 164.

The biochemical sensor(s) 115 can be configured to sense an ingredient and concentration of one of more body fluids of the skin. For example, the biochemical sensor(s) 115 can be configured to detect one or more of PH value, Ca+ concentration, and glucose concentration. Biochemical sensing circuitry 160 is provided and configured to produce a biochemical sensor output signal 162 using signals produced by the biochemical sensor(s) 115. The biochemical sensor output signal 162 can be communicated to the controller 117 for storage in the memory 117a.

The temperature sensor(s) 124 can be implemented using various temperature sensing technologies. For example, the temperature sensor(s) 124 can be a thermistor having a negative temperature coefficient (e.g., an NTC thermistor or NTC chip), a positive temperature coefficient (e.g., a PTC thermistor or PTC chip) or a digital thermistor. The temperature sensor(s) 124 can be a surface mount device (SMD) thermistor, thermocouple, resistance temperature detector (RTDs) or other type of resistance temperature sensor. Temperature sensing circuitry 170 is provided and configured to produce a temperature sensor output signal 172 using signals produced by the temperature sensor(s) 124. The temperature sensor output signal 172 can be communicated to the controller 117 for storage in the memory 117a.

The second NFC device 116 of the wearable sensor unit 110d is configured to wirelessly couple to and communicate with the first NFC device 104 of the ear-wearable electronic device 102. Due to the close physical proximity of the wearable sensor unit 110 and the ear-wearable electronic device 102 when deployed, the first and second NFC devices 104, 116 can be configured for inductive and/or capacitive near field communication therebetween. In some implementations, the first and second NFC devices 104, 116 can be configured for short-range radio frequency (RF) communication (e.g., RFID communication). An NFC link established between the first and second NFC devices 104, 116 can facilitate the transmission of power (e.g., unidirectional power transfer) from a power source of the ear-wearable electronic device 102 via the first NFC device 104 to power management circuitry of the wearable sensor unit 110 via the second NFC device 116. This NFC link can also facilitate unidirectional or bidirectional communication of various types of data and signals (e.g., control signals, diagnostic signals) between the wearable sensor unit 110 and the ear-wearable electronic device 102.

The first and second NFC devices 104, 116 can be implemented using a number of different technologies for transmitting energy in the form of electromagnetic fields or magnetic fields. In general terms, the first NFC device 104 is configured to convert power received from a power source of the ear-wearable electronic device 102 to an electromagnetic field (e.g., time-varying electromagnetic field). The second NFC device 116 of the wearable sensor unit 110*d* is configured to convert the electromagnetic field to DC and/or AC electric current which is used by electrical and electronic components of the wearable sensor unit 110.

The antenna arrangements of the first and second NFC devices 104, 116 can have varying configurations depending on the wireless power transfer technology implemented by the system 100. For example, the first and second NFC devices 104, 116 can be implemented to include one or more coils of wire which generate a magnetic field or a metal plate which generate an electric field. In some configurations, the first and second NFC devices 104, 116 can be configured as a near-field wireless power transfer arrangement using a variety of non-radiative technologies for effecting wireless power transfer (WPT) from the first NFC device 104 to the second NFC device 116.

According to some configurations, near-field wireless power/data transfer implemented by the first and second NFC devices 104, 116 can involve the transfer of power/data over relatively short distances by way of magnetic fields using inductive coupling between coils of wire disposed in the first and second NFC devices 104, 116. According to other configurations, near-field wireless power/data transfer implemented by the first and second NFC devices 104, 116 involves capacitive coupling between metal electrodes disposed in the first and second NFC devices 104, 116. These short range NFC technologies can include inductive coupling (Hz-MHz) implemented using wire coil antennas, capacitive coupling (kHz-MHz) implemented using metal plate electrodes, and magnetodynamic coupling (Hz) implemented using rotating magnets. In some configurations, near-field wireless power/data transfer implemented by the first and second NFC devices 104, 116 involves short-range RF communication (e.g., RFID communication).

According to other configurations, and as previously discussed, near-field wireless power/data transfer implemented by the first and second NFC devices 104, 116 can involve the transfer of power/data via light, such as IR light. In such configurations, the second NFC device 116 can be implemented as an optical power/data transfer device and the rechargeable power source 118 can include a photocell. An infrared LED can be located on the housing 103 of the ear-wearable electronic device 102 and arranged to irradiate the photocell 118. Optical energy produced by the photocell 118 can be accumulated in the rechargeable power source 118, which can include a lithium-ion cell, thin-film battery, capacitor or supercapacitor. Data transmission from the wearable sensor unit 110*d* to the ear-wearable electronic device 102 can be facilitated using IR or magnetic-based communication circuitry and techniques.

FIGS. 2A-2D illustrate a system 200 comprising an ear-wearable electronic device 202 and a physically separable wearable sensor unit 210 in accordance with any of the embodiments disclosed herein. The ear-wearable electronic device 202 shown in FIGS. 2A-2D is configured as a BTE device, such as BTE, RITE (receiver-in-the-ear) or RIC (receiver-in-canal) device (e.g., hearing aid or physiologic/activity monitor). The ear-wearable electronic device 202 includes a housing 203 configured for deployment on a wearer's ear. The housing 203 contains or supports a number of components, including those shown in FIG. 9, for example.

The housing 203 includes a skin contact surface 205 which includes a recessed transfer region 206 configured to receive a wearable sensor unit 210 and transfer the wearable sensor unit 210 to skin of a wearer's outer ear or head adjacent the outer ear. The wearable sensor unit 210 is configured to be temporarily constrained by or at the recessed transfer region 206 of the BTE housing 203 prior to deployment in a manner previously described (e.g., via one or more of mechanical interference, a passive material, magnetically). The wearable sensor unit 210 is affixed to the wearer's skin via a biocompatible adhesive 220. In the representative embodiment shown in FIG. 2D, the wearable sensor unit 210 includes a bed of microneedles 213 configured for transdermal biosensing. The microneedles 213 are micron-sized needles (e.g., miniaturized replicas of hypodermic needles) ranging from about 25 to about 2000 μm in height, from about 50 to about 250 μm in width, and from about 1 to about 25 μm in diameter. The microneedles 213 can be configured for transdermal biosensing of analytes of clinical interest, such as, glucose and various biomarkers. It is understood that the wearable sensor unit 210 can include any of the components shown in FIGS. 1A-1D.

Figure 3:
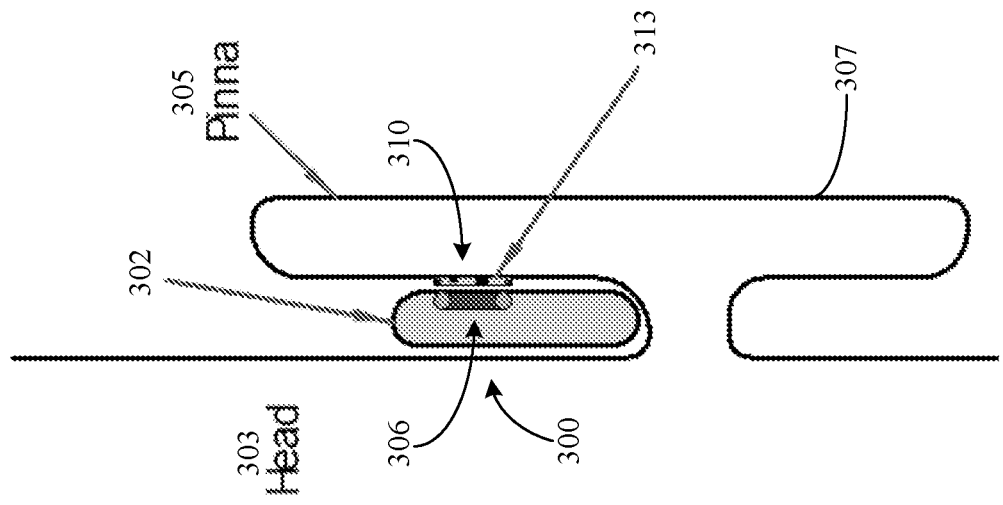
FIG. 3 illustrates a system comprising an ear-wearable electronic device and a wearable sensor unit deployed on an ear of a wearer in accordance with any of the embodiments disclosed herein.

FIG. 3 illustrates a system 300 comprising an ear-wearable electronic device 302 and a wearable sensor unit 310 deployed on an ear of a wearer in accordance with any of the embodiments disclosed herein. In FIG. 3, the ear-wearable electronic device 302 is a BTE device having a recessed transfer region 306 previously described and configured to physically transfer the wearable sensor unit 310 from the BTE device 302 to the inner pinna 305 of the wearer's ear 307. As previously discussed, the wearable sensor unit 310 can be physically transferred from the BTE device 302 to the wearer's head 303 proximate the inner pinna 305. FIG. 3 shows the wearable sensor unit 310 and the BTE device 302 in their deployed configuration during which the devices 302, 310 operate cooperatively in a various manners described herein.

According to some embodiments, the BTE device 302 can be configured with first and second recessed transfer regions 306 provided on different surfaces of the BTE device housing. The first and second recessed transfer regions 306 can be configured to respectively transfer first and second wearable sensor units 310 to the wearer's inner pinna 305 and head 303, for example. An ear-wearable electronic device 302 can be configured to communicatively couple power to the two wearable sensor units 310 concurrently, and to facilitate concurrent transfer of data to/from the two wearable sensor units 310.

During cooperative operation of the BTE device 302 on the wearer's ear 307 and the wearable sensor unit 310 affixed to the wearer's inner pinna 305 (or head 303 adjacent the pinna 305), the BTE device 302 and the wearable sensor unit 310 remain mechanically decoupled from one another, notwithstanding their close proximity (e.g., due to a gap between the recessed transfer region 306 and the wearable sensor unit 310). As such, the wearable sensor unit 310 has little or no physical contact with the BTE device 302 during cooperative deployment and operation on or in the wearer's ear 307, which eliminates or reduces undesirable motion artifacts that can otherwise corrupt the signal produced by one or more sensors of the wearable sensor unit 310 as previously described. In configurations that include a bed of microneedles 313, the elimination of physical contact between the BTE device 302 and the wearable sensor unit 310 reduces or eliminates undesirable movement of the microneedles 313, which can extend the life of the microneedles 313 and reduce/minimize skin irritation.

Figure 4B:
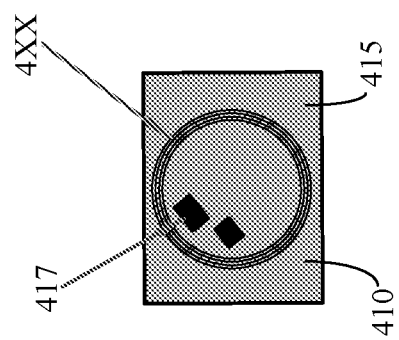
FIGS. 4A and 4B illustrate details of a representative wearable sensor unit in accordance with any of the embodiments disclosed herein.
Figure 4A:
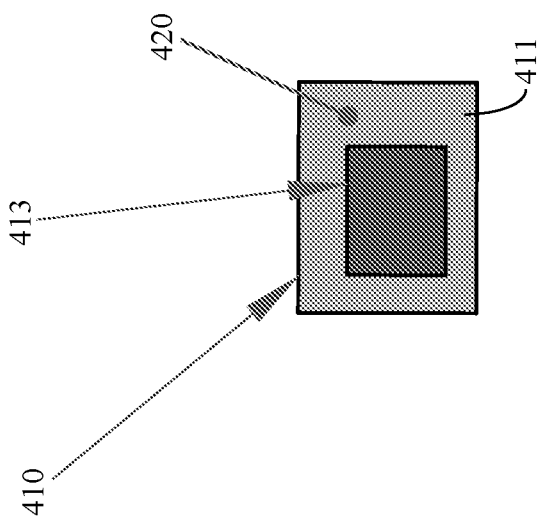

FIGS. 4A and 4B illustrate details of a representative wearable sensor unit 410 in accordance with any of the embodiments disclosed herein. The wearable sensor unit 410 can be the same or similar as any of the wearable sensor units shown in FIGS. 1A-3. In the representative example shown in FIGS. 4A and 4B, a skin contact surface 411 of the wearable sensor unit 410 includes a biocompatible adhesive 420 and a bed of microneedles 413 configured for transdermal biosensing. It is understood that the wearable sensor unit 410 can include any of the components shown in FIGS. 1A-3. FIG. 4B shows electronic and power circuitry 417 disposed on or in a second surface 415 of the wearable sensor unit 410. The second surface 415, which opposes the skin contact surface 411, is preferably positioned in close proximity to the ear-wearable electronic device when deployed in order to facilitate reliable power and data transfer between the ear-wearable electronic device and the wearable sensor unit 410.

Figure 6:
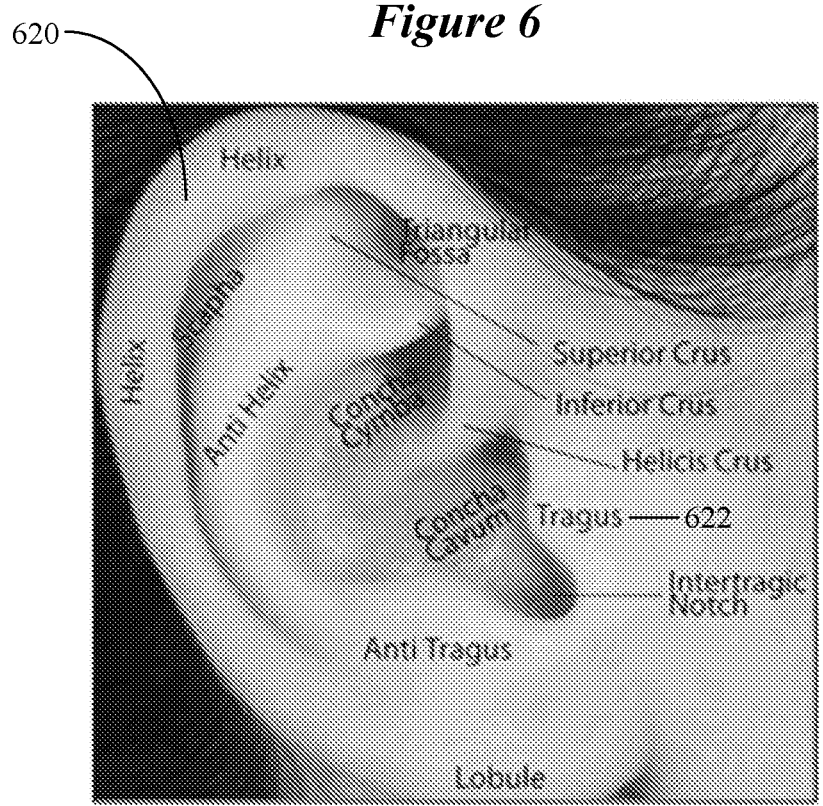
FIG. 6 shows a wearer's ear, including the tragus 622, for illustrative purposes.

FIG. 5 illustrates a system 500 comprising an ear-wearable electronic device 502 and a wearable sensor unit 510 configured for deployment within an ear of a wearer in accordance with any of the embodiments disclosed herein. The ear-wearable electronic device 502 shown in FIG. 5 is configured as an ITE device. The housing 503 of the ITE device 502 includes a skin contact surface 505 comprising a recessed transfer region 506 of a type described. The transfer region 506 is configured to facilitate the physical transfer of the wearable sensor unit 510 from the ITE device 502 to a specified location within the wearer's ear, such as the tragus. An illustration of a wearer's ear 620, including the tragus 622, is shown in FIG. 6 for illustrative purposes. The wearable sensor unit 510 can be configured to include any or all of the components and features of the wearable sensor units shown in FIGS. 1A-4B.

FIGS. 7A and 7A illustrate systems 700a, 700b comprising an ear-wearable electronic device 702 and a wearable sensor unit 710a, 710b configured for deployment within an ear of a wearer in accordance with any of the embodiments disclosed herein. The ear-wearable electronic device 702 shown in FIGS. 7A and 7B is configured as an ITE device configured for deployment at least partially in an ear canal of a wearer's ear. The wearable sensor unit 710a, 710b is configured for deployment in the ear canal of the wearer's ear. The wearable sensor unit 710a shown in FIG. 7A can be implemented according to the embodiments shown in FIGS. 1C and 1D, in which a coil antenna 722 is positioned at or proximate an inner circumference/void 713 of the wearable sensor unit 710a. The wearable sensor unit 710b shown in FIG. 7B can be implemented according to the embodiments shown in FIGS. 1C and 1D, but with a coil antenna 722 positioned at or proximate an outer circumference of the wearable sensor unit 710b.

The ITE device 702 includes a transfer surface 706 defined by a terminal distal surface of the ITE device 702. The transfer surface 706 of the ITE device 702 is configured to contact a terminal proximal surface 712 of the wearable sensor unit 710a, 710b to facilitate transfer of the wearable sensor unit 710a, 710b into the wearer's ear canal via manual force applied to a terminal proximal surface 704 of the ITE device 702.

During deployment, when the ITE device 702 is placed within the ear canal, the wearable sensor unit 710a, 710b is also placed within the ear canal in front of the ITE device 702. During cooperative operation, the ITE device 702 and the wearable sensor unit 710a, 710b remain mechanically decoupled from one another while concurrently being communicatively coupled via an NFC link as previously described. A small gap between the ITE device 702 and wearable sensor unit 710a, 710b when deployed in the ear canal effectively isolates the sensors and electrodes of the wearable sensor unit 710a, 710b from ITE device movement. For example, the ITE device 702 is subject to mandibular movement which can alter the ear canal diameter by a few millimeters. Neck muscle contraction can also cause ear canal changes. When deployed in the ear canal, the wearable sensor unit 710a, 710b is mechanically isolated from mandibular motion of the ITE device 702.

Figure 8:
FIG. 8 shows an extraction tool configured to remove the wearable sensor unit shown in FIGS. 7A and 7B from the wearer's ear canal.

When removal of the ITE device 702 from the wearer's ear is desired, such as during sleep, the ITE device 702 can be removed while the wearable sensor unit 710a, 710b remains positioned within the wearer's ear canal. In some embodiments, and as previously discussed, the wearable sensor unit 710a, 710b can include a rechargeable power source (e.g., a lithium-ion battery or cell, a thin-film battery, a capacitor, a supercapacitor) coupled to the NFC device of the wearable sensor unit 710a, 710b. In such embodiments, the wearable sensor unit 710a, 710b can continue operation for a number of hours (e.g., any number of hours between about 2 and 10 hours) after the ITE device 702 is removed from the wearer's ear. When it is desired to remove the wearable sensor unit 710a, 710b, an extraction tool 800 shown in FIG. 8 can be used to remove the wearable sensor unit 710a, 710b from the wearer's ear canal.

The wearable sensor unit 710a, 710b can be configured to include any or all of the components and features of the wearable sensor unit shown in FIGS. 1C and 1D. The ear-wearable electronic device 702 can be configured to include any or all of the components and features of the ear-wearable electronic devices shown in FIG. 9.

Figure 9:
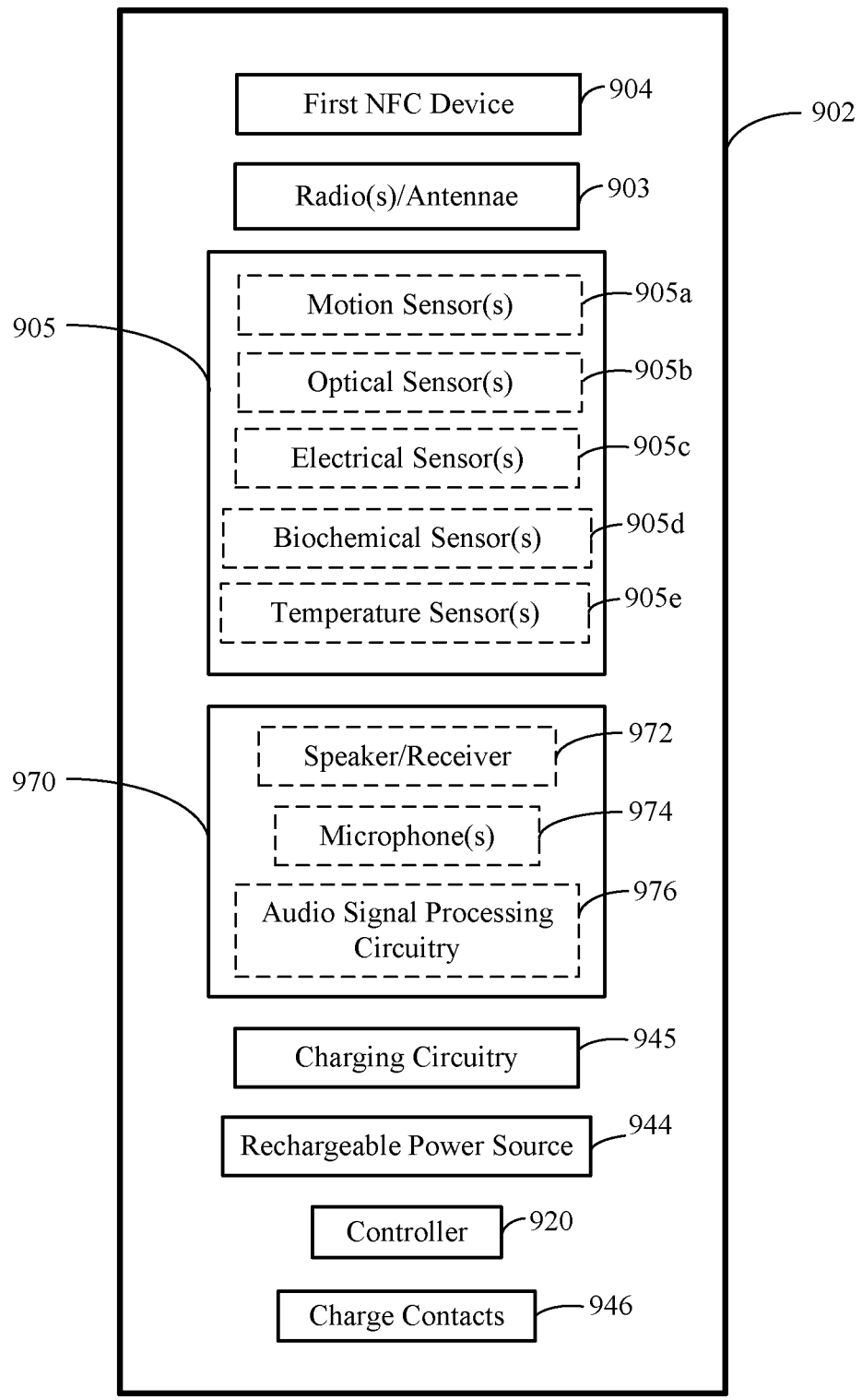
FIG. 9 is a block diagram of an ear-wearable electronic device suitable for use with any of the wearable sensor units disclosed herein.

FIG. 9 is a block diagram of a representative ear-wearable electronic device 902 which be configured to cooperate with any of the wearable sensor units disclosed herein. The device 902 is representative of a wide variety of electronic devices configured to be deployed in, on or about an ear of a wearer. The device 902 includes a first NFC device 904 of a type previously described, and may also include one or more RF radios/antennae 903 (e.g., compliant with a Bluetooth® or IEEE 802.11 protocol). The RF radios/antennae 903 can be configured to effect communications with an external electronic device, communication system, and/or the cloud. Wearable sensor unit data acquired by the ear-wearable electronic device 902 can be communicated to a smartphone, laptop, network server, and/or the cloud (e.g., a cloud server and/or processor). The device 902 includes a controller 920, a rechargeable power source 944, charging circuitry 945, and charge contacts 946.

The device 902 can include one or more sensors 905 of a type previously described in connection with any of the wearable sensor units. For example, the device 902 can include one or more of a motion sensor 905a, one or more optical sensors 905b, one or more electrode-based sensors 905c, one or more biochemical sensors 905d, and/or one or more temperature sensors 905e.

In accordance with any of the embodiments disclosed herein, the device 902 can be configured as a hearing device or a hearable which includes an audio processing facility 970. The audio processing facility 970 includes audio signal processing circuitry 976 coupled to an acoustic transducer 972 (e.g., speaker, receiver, bone conduction device) and optionally to one or more microphones 974 coupled to the audio signal processing circuitry 976. In other embodiments, the device 902 can be devoid of the audio processing facility 970.

According to embodiments that incorporate the audio processing facility 970, the device 902 can be implemented as a hearing assistance device that can aid a person with impaired hearing. For example, the device 902 can be implemented as a monaural hearing aid or a pair of devices 902 can be implemented as a binaural hearing aid system, in which case left and right devices 902 are deployable with corresponding left and right wearable sensor units. The monaural device 902 or a pair of devices 902 can be configured to effect bi-directional communication (e.g., wireless communication) of data with an external source, such as a remote server via the Internet or other communication infrastructure. The device or devices 902 can be configured to receive streaming audio (e.g., digital audio data or files) from an electronic or digital source. Representative electronic/digital sources (e.g., accessory devices) include an assistive listening system, a streaming device (e.g., a TV streamer or audio streamer), a remote microphone, a radio, a smartphone, a laptop, a cell phone/entertainment device (CPED) or other electronic device that serves as a source of digital audio data, control and/or settings data or commands, and/or other types of data files.

The controller 920 shown in FIG. 9 (and the controller 117 shown in FIGS. 1B-1D) can include one or more processors or other logic devices. For example, the controller 920, 117 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The controller 920, 117 can incorporate or be coupled to various analog components (e.g., analog front-end), ADC and DAC components, and Filters (e.g., FIR filter, Kalman filter). The controller 920, 117 can incorporate or be coupled to memory. The memory can include one or more types of memory, including ROM, RAM, SDRAM, NVRAM, EEPROM, and FLASH, for example.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. A system, comprising:
an ear-wearable electronic device comprising a first near-field communication (NFC) device and a transfer region configured to facilitate transfer of a wearable sensor unit into an ear of a wearer or onto an outer ear of the wearer or a surface of the wearer's head adjacent the outer ear; and
the wearable sensor unit comprising:
electronic circuitry comprising a second NFC device configured to communicatively couple to the first NFC device and facilitate wireless transfer of power from the ear-wearable electronic device to the wearable sensor unit and wireless transfer of data at least from the wearable sensor unit to the ear-wearable electronic device; and
one or more sensors configured to measure at least one physiologic parameter or physiologic condition of the wearer;
wherein the wearable sensor unit and the ear-wearable electronic device are configured to remain mechanically decoupled from one another subsequent to transfer of the wearable sensor unit into the wearer's ear or onto the outer ear of the wearer or the surface of the wearer's head adjacent the outer ear, wherein the wearable sensor unit and the ear-wearable electronic device are further configured to wirelessly transfer, while mechanically decoupled, power from the ear-wearable electronic device to the wearable sensor unit and data at least from the wearable sensor unit to the ear-wearable electronic device.

2. The system according to claim 1, wherein the wearable sensor unit comprises a substantially planar flexible printed circuit board (PCB) configured to support at least the electronic circuitry, the second NFC device, and the one or more sensors.

3. The system according to claim 1, wherein:
the ear-wearable electronic device comprises a housing configured for behind-the-ear deployment;
the transfer region defines a recessed region of the housing configured to receive the wearable sensor unit; and
the transfer region is situated on the housing at a location that facilitates transfer of the wearable sensor unit to a specified location of the outer ear of the wearer or the surface of the wearer's head adjacent the outer ear.

4. The system according to claim 1, wherein:
the ear-wearable electronic device comprises a housing configured for behind-the-ear deployment; and
the wearable sensor unit comprises a biocompatible adhesive disposed on a surface configured to contact the outer ear of the wearer or the surface of the wearer's head adjacent the outer ear.

5. The system according to claim 1, wherein:
the ear-wearable electronic device comprises a housing configured for deployment at least partially in an ear canal and a concha of the wearer's ear;
the transfer region defines a recessed region of the housing configured to receive the wearable sensor unit; and
the transfer region is situated on the housing at a location that facilitates transfer of the wearable sensor unit to a tragus of the wearer's ear.

6. The system according to claim 1, wherein the wearable sensor unit comprises a substantially cylindrical flexible printed circuit board (PCB) configured to support at least the electronic circuitry, the second NFC device, and the one or more sensors.

7. The system according to claim 6, wherein:
the ear-wearable electronic device is configured for deployment at least partially in an ear canal of the wearer's ear;
the wearable sensor unit is configured for deployment in the ear canal; and
the transfer region defines a terminal distal surface of the ear-wearable electronic device configured to contact a terminal proximal surface of the wearable sensor unit to facilitate transfer of the wearable sensor unit into the ear canal.

8. The system according to claim 1, wherein the one or more sensors comprise one or more of:
an optical sensor configured to produce a photoplethysmogram (PPG);
a bed of microneedles;
a blood glucose sensor;
an electrodermal activity sensor;
a bioimpedance sensor;
a biochemical sensor;
a temperature sensor or temperature sensors; and
an ambient light sensor.

9. The system according to claim 1, wherein the first and second NFC devices comprise an inductive NFC device, a capacitive NFC device, or an optical NFC device.

10. The system according to claim 1, wherein the wearable sensor unit is a passive wearable sensor unit.

11. The system according to claim 1, wherein the ear-wearable electronic device comprises a hearing device.

12. The system according to claim 1, wherein the ear-wearable electronic device comprises a hearing aid.

13. A method, comprising:
mechanically coupling an ear-wearable electronic device comprising a first near-field communication (NFC) device and a wearable sensor unit comprising a second NFC device;
transferring the wearable sensor unit into an ear of a wearer or onto an outer ear of the wearer or a surface of the wearer's head adjacent the outer ear using the mechanically coupled ear-wearable electronic device;
mechanically decoupling the wearable sensor unit and the ear-wearable electronic device after transferring the wearable sensor unit;
wirelessly transferring, while mechanically decoupled, power from the ear-wearable electronic device to the wearable sensor unit; and
wirelessly transferring, while mechanically decoupled, data at least from the wearable sensor unit to the electronic device.

14. The method according to claim 13, wherein transferring the wearable sensor unit comprises:
transferring the wearable sensor unit to a behind-the-ear location of the wearer's outer ear; or
transferring the wearable sensor unit to a tragus of the wearer's outer ear; or
transferring the wearable sensor unit to a location of the wearer's head proximate an inner surface of the wearer's pinna.

15. The method according to claim 13, wherein the one or more sensors comprise one or more of:
an optical sensor configured to produce a photoplethysmogram (PPG);
a bed of microneedles;
a blood glucose sensor;
an electrodermal activity sensor;
a bioimpedance sensor;
a biochemical sensor;

a temperature sensor or temperature sensors; and
an ambient light sensor.

16. The method according to claim 13, wherein transferring the wearable sensor unit comprises transferring the wearable sensor unit into an ear canal of the wearer.

17. The method according to claim 13, wherein transferring the wearable sensor unit comprises adhesively affixing the wearable sensor unit to skin of the wearer's outer ear or head.

18. The method according to claim 13, wherein the one or more sensors comprise one or more of:
an electroencephalography (EEG) sensor;
an electromyography (EMG) sensor;
an electrooculography (EOG) sensor; and
an electrocardiogram (ECG) sensor.

19. The system according to claim 1, wherein the one or more sensors comprise one or more of:
an electroencephalography (EEG) sensor;
an electromyography (EMG) sensor;
an electrooculography (EOG) sensor; and
an electrocardiogram (ECG) sensor.

20. The system according to claim 1, wherein:
the one or more sensors are configured as sensors that produce signals corruptible by motion artifacts; and
mechanically decoupling the wearable sensor unit and the ear-wearable electronic device from one another serves to reduce or eliminate corruption of the sensor signals by motion artifacts.

* * * * *